(12) United States Patent  
Keshav et al.

(10) Patent No.: US 8,311,497 B2
(45) Date of Patent: Nov. 13, 2012

(54) METHOD AND SYSTEM FOR SCANNING FREQUENCIES IN NO-SERVICE AREA FIELD

(75) Inventors: Kirti Keshav, Karnataka (IN); Prakash Rao, Karnataka (IN); Seshagiri R. Gorantla, Karnataka (IN)

(73) Assignee: Samsung Electronics Co., Ltd (KR)

( * ) Notice: Subject to any disclaimer, the term of this patent is extended or adjusted under 35 U.S.C. 154(b) by 267 days.

(21) Appl. No.: 12/626,292

(22) Filed: Nov. 25, 2009

(65) Prior Publication Data

US 2010/0136914 A1 Jun. 3, 2010

(30) Foreign Application Priority Data

Nov. 26, 2008 (IN) .............................. 2962/CHE/2008

(51) Int. Cl.  
*H04B 1/18* (2006.01)

(52) U.S. Cl. ..................... 455/161.1; 455/62; 455/186.1; 455/181.1; 455/164.1; 455/168.1

(58) Field of Classification Search ............... 455/161.1, 455/62, 186.1, 181.1, 164.1, 168.1  
See application file for complete search history.

(56) References Cited

U.S. PATENT DOCUMENTS

| | | | | |
|---|---|---|---|---|
| 5,163,161 | A * | 11/1992 | Bowles et al. | 455/164.1 |
| 6,979,992 | B2 * | 12/2005 | Craven | 324/76.19 |
| 7,904,083 | B2 * | 3/2011 | Lam | 455/434 |
| 2009/0131051 | A1 * | 5/2009 | Zhang et al. | 455/435.1 |

* cited by examiner

*Primary Examiner* — Sanh Phu  
(74) *Attorney, Agent, or Firm* — The Farrell Law Firm, P.C.

(57) ABSTRACT

A method and a system for scanning frequencies in an electronic device include storing one or more frequencies, performing a scan based on the stored frequencies for a predetermined time interval, and establishing a connection based on the scan. The system includes an acquisition database for scanning frequencies in an electronic device, a timer module for setting a predetermined time interval as the scanning interval, and a frequency identification module for identifying one or more frequencies of a normal scan and a limited scan.

6 Claims, 3 Drawing Sheets

METHOD AND SYSTEM FOR SCANNING FREQUENCIES IN NO-SERVICE AREA FIELD

PRIORITY

This application claims priority under 35 U.S.C. §119 to an application entitled filed in the Indian Patent Office on Nov. 26, 2008, and assigned Serial No. 2962/CHE/2008, the content of which is incorporated herein by reference.

BACKGROUND OF THE INVENTION

1. Field of the Invention

The present invention generally relates to the field of scanning one or more frequencies for establishing a service in an electronic device.

2. Description of the Related Art

Often, it is time consuming to search for a service for a mobile device in a no-service area. A no-service area is an area where no communication services are available. In the conventional technique, the mobile device continuously performs a complete full band scan for one or more frequencies every time the user enters the no-service area. Moreover, battery consumption is increased for performing a full band scan.

In light of the foregoing problems there is a need for an efficient technique for scanning frequencies in a mobile device for service when a user enters a no-service area.

SUMMARY OF THE INVENTION

Embodiments of the present invention described herein provide a method and system for scanning frequencies in an electronic device.

In accordance with an embodiment of the present invention, disclosed is a method for scanning frequencies in an electronic device, the method includes storing one or more frequencies, performing a scan based on the stored frequencies for a predetermined time interval, and establishing a connection based on the scan.

In accordance with an embodiment of the present invention, disclosed is a system that includes an electronic device for scanning frequencies, the system includes an acquisition database for scanning frequencies in an electronic device, a timer module for setting a predetermined time interval for the scanning interval, and a frequency identification module for identifying one or more frequencies of a normal scan and a limited scan.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE INVENTION

Embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention. The terms and words used in the following description and claims are not limited to the bibliographical meanings, but are merely used by the inventor to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

Embodiments of the present invention described herein provide a method and system for scanning frequencies in an electronic device.

Figure 1:
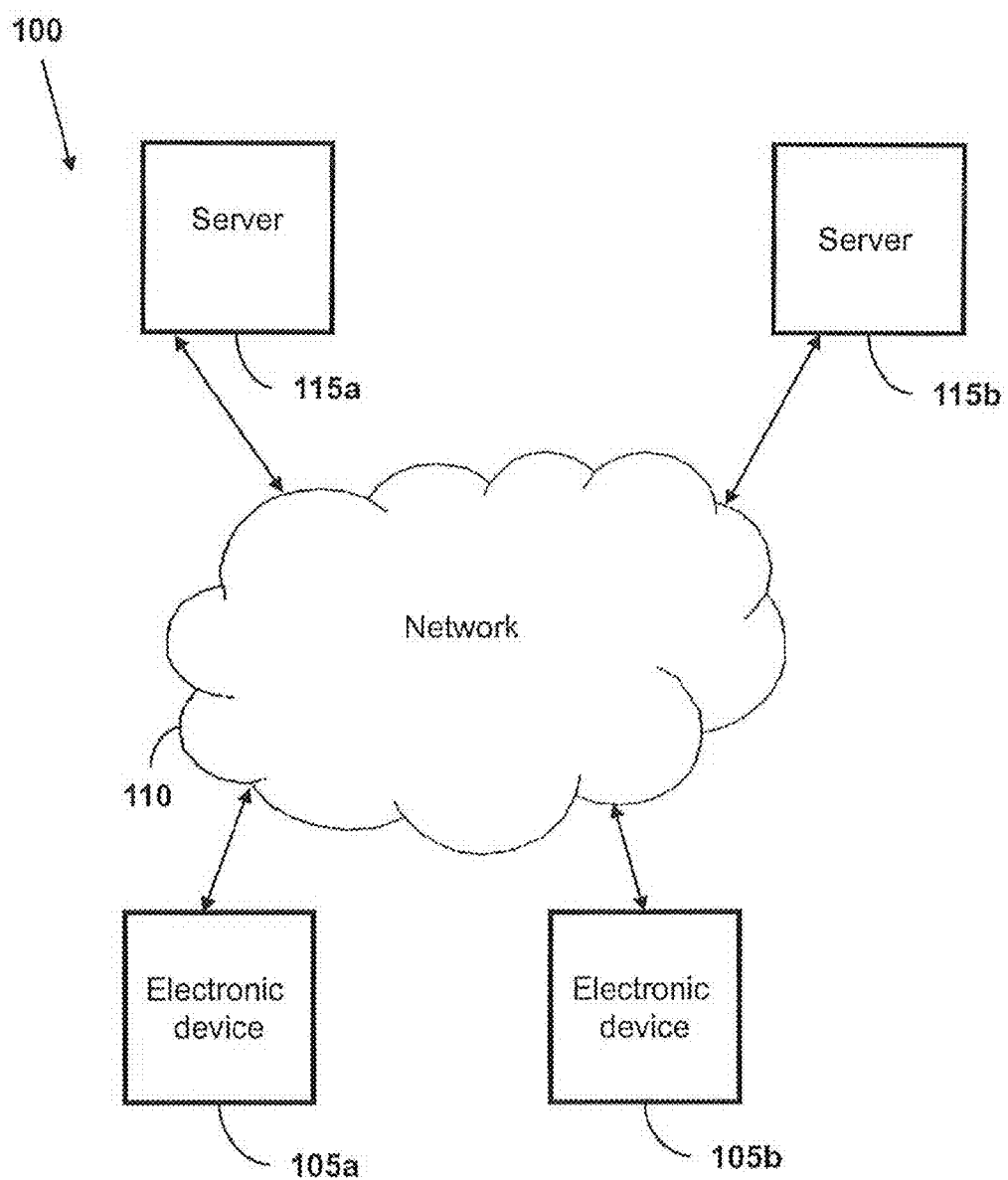
FIG. 1 is a block diagram of an environment in accordance with the embodiments of the present invention.

FIG. 1 is a block diagram of an environment 100 in accordance with various embodiments of the present invention. The environment 100 includes one or more electronic devices, for example, electronic device 105a and electronic device 105b connected to each other through a network 110.

The electronic device 105a is connected to one or more servers, for example, server 115a and server 115b through the network 110. The electronic device 105a scans for one or more frequencies to establish a connection with the server 115a through the network 110. The one or more frequencies correspond to frequencies at which the electronic device 105a connects to the server 115a.

Examples of the electronic devices include, but are not limited to, computers, laptops, mobile devices, data processing units, computing devices, hand held devices, and Personal Digital Assistants (PDAs). Examples of the network 110 include but are not limited to a Local Area Network (LAN), a Wireless Local Area Network (WLAN), a Wide Area Network (WAN), the Internet and a Small Area Network (SAN). Examples of the server 115a include but are not limited to, a content server, a Dynamic Host Configuration Protocol (DHCP) server, a mail server, a Domain server, a File Transfer Protocol (FTP) server, a Domain Name System (DNS) server and a web server.

Figure 2:
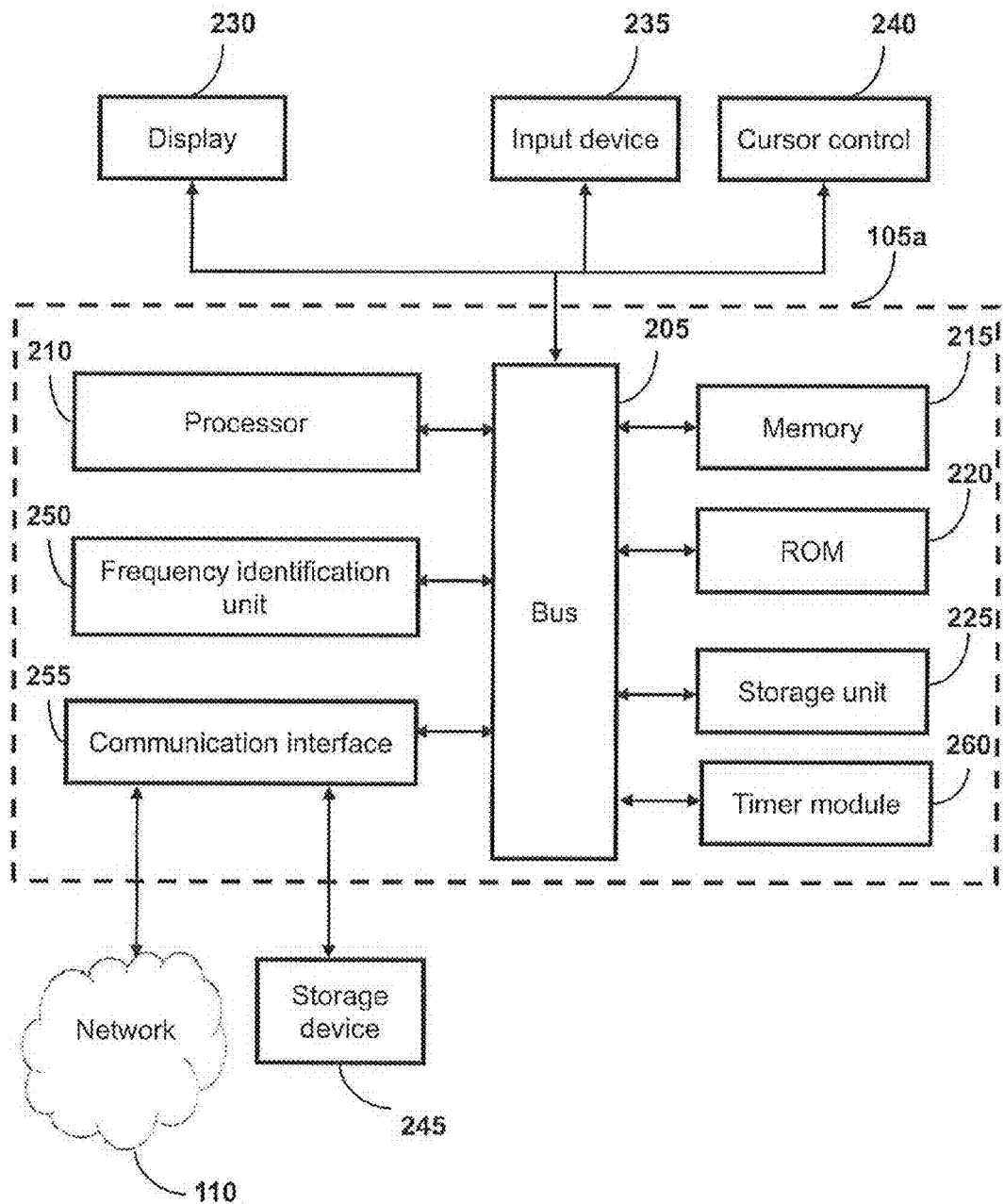
FIG. 2 is a block diagram of an electronic device in accordance with an embodiment of the present invention.

The electronic device 105a includes various elements and is explained in conjunction with FIG. 2.

FIG. 2 is a block diagram of the electronic device 105a in accordance with an embodiment of the present invention. The electronic device 105a includes a bus 205 or other communication mechanism for communicating information. The electronic device 105a includes a processor 210 coupled to the bus 205. Further, the electronic device 105a includes a memory 215, such as a Random Access Memory (RAM) or other dynamic storage device, coupled to the bus 205 for storing electronic mail and instructions to be executed by processor 210. The memory 215 can be used for storing any temporary information required. The electronic device 105a further includes a Read Only Memory (ROM) 220 or other static storage device coupled to the bus 205 for storing static information and instructions for the processor 210. A storage unit 225, such as a magnetic disk or optical disk, is provided and coupled to the bus 205 for storing information.

The electronic device 105a can be coupled via the bus 205 to a display unit 230, such as a Cathode Ray Tube (CRT), a Liquid Crystal Display (LCD) or a Light Emitting Diode (LED) display, for displaying information. An input device 235, including alphanumeric and other keys, is coupled to the bus 205 for communicating information and command selections to the processor 210. Another type of user input device is a cursor control 240, such as a mouse, a trackball, or cursor direction keys for communicating direction information and command selections to the processor 210 and for controlling cursor movement on the display unit 230. The input device 235 can also be included in the display 230, for example a touch screen.

Various embodiments are related to the use of the electronic device 105a for implementing the techniques described herein. In one embodiment, the techniques are performed by the processor 210 using information included in the memory 215. The information can be read into the memory 220 from another machine-readable medium, such as the storage unit 225.

The term "machine-readable medium" as used herein refers to any medium that participates in providing data that causes a machine to operate in a specific fashion. In an embodiment implemented using the electronic device 105a, various machine-readable medium are involved, for example, in providing instructions to processor 210 for execution. The machine-readable medium can be a storage media. Storage media includes both non-volatile media and volatile media. Non-volatile media includes, for example, optical or magnetic disks, such as the storage unit 225. Volatile media includes dynamic memory, such as the memory 215. All such media must be tangible to enable the instructions carried by the media to be detected by a physical mechanism that reads the instructions into a machine. Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

Further the electronic device 105a includes a storage device 245 for storing the one or more frequencies. Further the storage device 245 includes an acquisition database for storing the one or more previously scanned frequencies.

The electronic device 105a also includes a frequency identification unit 250, for identifying one or more frequencies of a normal scan and a limited scan.

The electronic device 105a also includes a communication interface 255 coupled to the bus 205. The communication interface 255 provides a two-way data communication coupling to network 110. For example, the communication interface 255 can be a LAN card to provide a data communication connection to a compatible LAN. Wireless links can also be implemented. In any such implementation, the communication interface 255 sends and receives electrical, electromagnetic or optical signals that carry digital data streams representing various types of information. The communication interface 255 can be a universal serial bus port.

Furthermore the electronic device 105a includes a timer module 260 for setting a predetermined time interval for the scanning. The electronic device 105a scans for one or more frequencies stored in the acquisition database for a predetermined time interval.

Figure 3:
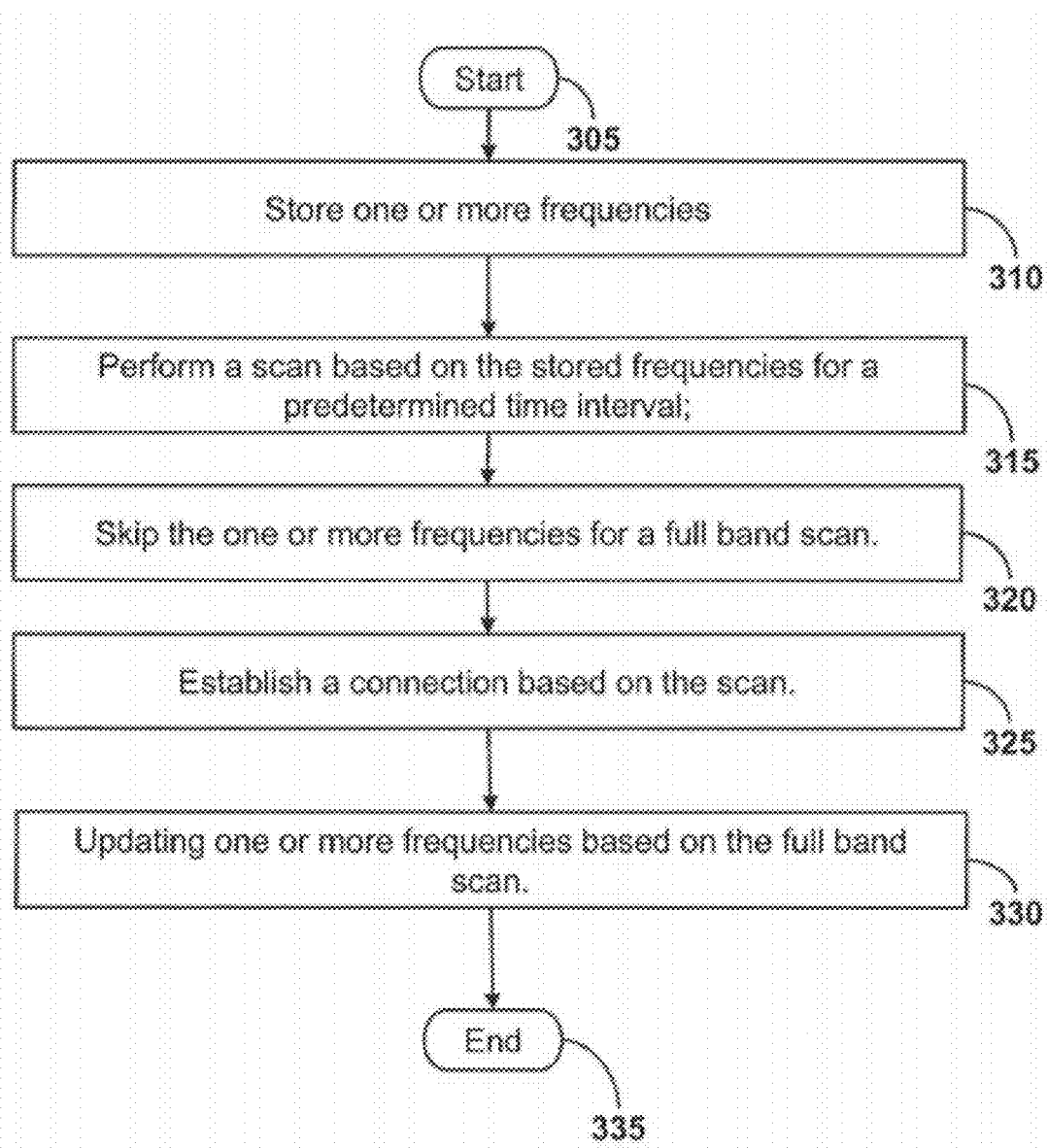
FIG. 3 is a flowchart illustrating a method for scanning frequencies in an electronic device in accordance with an embodiment of the present invention.

FIG. 3 is a flowchart illustrating a method for scanning frequencies in no-service area in accordance with an embodiment of the present invention.

The method starts at step 305. At step 310, the one or more frequencies are stored in an acquisition database. The acquisition database includes both normal service frequencies and limited service frequencies previously scanned for establishing a connection with the service provider in both the service area and no-service area.

The normal service frequencies are the frequencies on which the electronic device was able to receive normal service. Further the limited service frequencies are the frequencies on which the electronic device was able to receive limited service. The limited service frequency can contain frequencies of Forbidden PLMN (FPLMN) on which the electronic device was able to receive limited service.

At step 315, the scan is performed based on the stored one or more frequencies for a predetermined time interval. The scanning of one or more frequencies is initiated by "Non Access Stratum portion of protocol stack in Mobile Station" (NAS) when the mobile device is in no-service area. The NAS sends a Radio Resource Control (RRC) service request to the electronic device to perform a scan. On receiving the RRC service request by the electronic device the scan is performed for the one or more frequencies.

The electronic device first performs a scan for the stored one or more frequencies in the acquisition database for a predetermined time interval. The electronic device continues with the search for a predetermined time interval for each subsequent request received during the time interval.

After the predetermined time interval has expired and if no service is available for the stored frequencies in the acquisition database, a full band scan is performed.

At step 320, the one or more frequencies are skipped when the full band scan is performed. The one or more frequencies skipped corresponds to frequencies of Forbidden Public Land Mobile Network (FPLMN).

The frequencies, namely FPLMN frequencies, are skipped as the corresponding frequencies were previously updated for a predetermined time interval in the acquisition database and are available for scan at any point in time.

In one embodiment, an emergency call can also be made by the user in no-service area. The emergency call is established based on the one or more frequencies updated in the acquisition database.

At step 325, a connection is established based on the scanned one or more frequencies. At step 330, the acquisition database is updated with one or more frequencies based on the full band scan. The method ends at step 335.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for scanning frequencies in an electronic device, the method comprising the steps of:
    storing one or more frequencies;
    performing a scan based on the stored one or more frequencies for a predetermined time interval;
    determining that no service is available after scanning the stored one or more frequencies for the predetermined time interval; and
    performing a full band scan, wherein the stored one or more frequencies are skipped during the full band scan, wherein the skipped frequencies include frequencies of a Forbidden Public Land Mobile Network on which the electronic device was able to receive limited service.

2. The method of claim 1, further comprising:
    updating the stored one or more frequencies based on the full band scan.

3. The method of claim 1, further comprising:
    identifying at least one of a normal service frequency and a limited service frequency from the stored one or more frequencies.

4. A system for scanning frequencies in an electronic device, the system comprising:

an acquisition database for storing one or more frequencies;

a timer module for setting a predetermined time interval for scanning the stored one or more frequencies; and a frequency identification module for a scanning the stored one or more frequencies for the predetermined time interval, determining that no service is available after scanning the stored one or more frequencies for the predetermined time interval, and performing a full band scan, wherein the stored one or more frequencies are skipped during the full band scan, wherein the skipped frequencies include frequencies of a Forbidden Public Land Mobile Network on which the electronic device was able to receive limited service.

5. The system of claim 4, further comprising a processor for establishing a connection based on a scan.

6. The system of claim 4, wherein the one or more frequencies are updated based on the full band scan.

* * * * *